H. B. JAMES.
MAINSPRING BARREL FOR WATCHES.

No. 107,916. Patented Oct. 4, 1870.

Witnesses.
C. F. Clausen
A. Ruppert.

Henry B. James
Inventor.

United States Patent Office.

HENRY B. JAMES, OF TRENTON, NEW JERSEY.

Letters Patent No. 107,916, dated October 4, 1870.

IMPROVEMENT IN THE MAINSPRING-BARRELS OF WATCHES.

The Schedule referred to in these Letters Patent and making part of the same.

I, HENRY B. JAMES, of Trenton, in the county of Mercer and State of New Jersey, have invented certain Improvements in Mainspring-Barrels, of which the following is a specification.

Description of the Accompanying Drawings.

Similar letters refer to similar parts in all the figures.

Nature and Objects of the Invention

Figure 1:
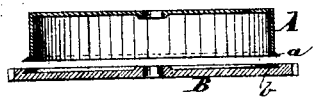
Figure 1 is a vertical section, through the center of the barrel and main wheel of a watch, separate and enlarged.

The first part of my invention relates to the combination of the mainspring-barrel of watch or other movements, confined within the main wheel, and securing them together by the flange $a$ on the former, to spring into the groove $b$ in the latter, fig. 1, the object of this part of my invention being to unite them together with the mainspring in the barrel. A is the barrel. B is the main wheel.

Figure 2:
Figure 2 is the barrel and main wheel, put together as designed.
Figure 3:
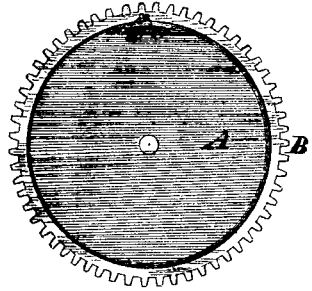
Figure 3 is a plan view.

The second part of my invention relates to the combination of the stop $c$ connected with the main wheel, and the stop $d$ connected with the barrel, the object of this part of my invention being to impart the power of the mainspring to the main wheel and train, upon winding the mainspring, as usual, and to allow the barrel to turn within the main wheel upon the breakage of the mainspring, thereby shielding the wheel and train from injury, as shown in fig. 2. A is the barrel. B is the main wheel.

General Description.

A, fig. 1, is the barrel.

$a$, the flange, which is fitted into the groove $b$ in the main wheel B. They are sprung into the barrel.

The stop $c$ projects outward from the barrel sufficiently to connect with the stop $d$, projecting vertically from the main wheel, and, upon winding, they connect together and sustain the force of the mainspring upon the train, the barrel being free to turn within the wheel, unless preferred to be made friction-tight. In that case the stops may not be needed.

Claims.

I claim as my invention—

1. The combination of the mainspring-barrel, provided with a small holding-flange, and the main wheel, provided with a corresponding recess, constructed substantially as and for the purposes specified.

2. The combination of the stop $c$ connected with the main wheel, and the stop $d$ connected with the barrel, operating as and for the purposes specified.

HENRY B. JAMES.

Witnesses:
ISRAEL HOWELL,
BARTON PAGE ROSS.